(12) United States Patent
Kuwako

(10) Patent No.: US 9,081,984 B2
(45) Date of Patent: Jul. 14, 2015

(54) DOCUMENT CONTROL APPARATUS AND DOCUMENT CONTROL METHOD

(71) Applicant: NEC Corporation, Minato-ku, Tokyo (JP)

(72) Inventor: Shizuho Kuwako, Tokyo (JP)

(73) Assignee: NEC CORPORATION, Tokyo (JP)

( * ) Notice: Subject to any disclaimer, the term of this patent is extended or adjusted under 35 U.S.C. 154(b) by 147 days.

(21) Appl. No.: 13/968,585

(22) Filed: Aug. 16, 2013

(65) Prior Publication Data

US 2014/0059705 A1    Feb. 27, 2014

(30) Foreign Application Priority Data

Aug. 22, 2012    (JP) ................................ 2012-183209

(51) Int. Cl.
| | |
|---|---|
| *G06F 21/00* | (2013.01) |
| *G06F 21/62* | (2013.01) |
| *G06F 21/31* | (2013.01) |
| *H04L 29/06* | (2006.01) |

(52) U.S. Cl.
CPC ............ *G06F 21/6218* (2013.01); *G06F 21/31* (2013.01); *G06F 21/62* (2013.01); *H04L 63/102* (2013.01); *H04L 63/104* (2013.01)

(58) Field of Classification Search
CPC ..... G06F 21/6218; G06F 21/31; G06F 21/10; H04L 63/10; H04L 63/102; H04L 63/104
See application file for complete search history.

(56) References Cited

U.S. PATENT DOCUMENTS

| | | | |
|---|---|---|---|
| 2004/0010606 A1* | 1/2004 | Delaney et al. ............... | 709/229 |
| 2004/0133793 A1* | 7/2004 | Ginter et al. ................... | 713/193 |
| 2005/0288939 A1* | 12/2005 | Peled et al. ........................ | 705/1 |
| 2006/0242065 A1* | 10/2006 | Jogand-Coulomb et al. ... | 705/50 |
| 2006/0253771 A1* | 11/2006 | Baschy .......................... | 715/500 |
| 2008/0222734 A1* | 9/2008 | Redlich et al. .................. | 726/26 |
| 2009/0222884 A1* | 9/2009 | Shaji et al. ........................ | 726/1 |
| 2009/0254392 A1* | 10/2009 | Zander ............................. | 705/7 |
| 2009/0327293 A1* | 12/2009 | Takashima ........................ | 707/9 |

FOREIGN PATENT DOCUMENTS

| | | |
|---|---|---|
| JP | 2004-54779 A | 2/2004 |
| JP | 2005-85136 A | 3/2005 |
| JP | 2009-104646 A | 5/2009 |

\* cited by examiner

*Primary Examiner* — Harunur Rashid
*Assistant Examiner* — Sher Khan
(74) *Attorney, Agent, or Firm* — Sughrue Mion, PLLC

(57) ABSTRACT

The document access authorization violation detection apparatus detects, for each of documents, whether or not there is any violation in access authorization to access the document, by using statistical values calculated from duty position levels, which represents height levels of corresponding official positions of users who are authorized to access the document, or inter-organization distances, which are obtained by digitizing inter-organization positional removes from respective groups, to which the users belong, to a group whose member number is larger than any other one of the groups. As a result, the document access authorization violation detection apparatus makes it possible to efficiently detect whether or not there is any violation in access authorization with respect to each of documents.

9 Claims, 12 Drawing Sheets

| USER'S OFFICIAL POSITION | DUTY POSITION LEVEL |
|---|---|
| MANAGER | 0.8 |
| CHIEF STAFF | 0.5 |
| STAFF | 0.2 |

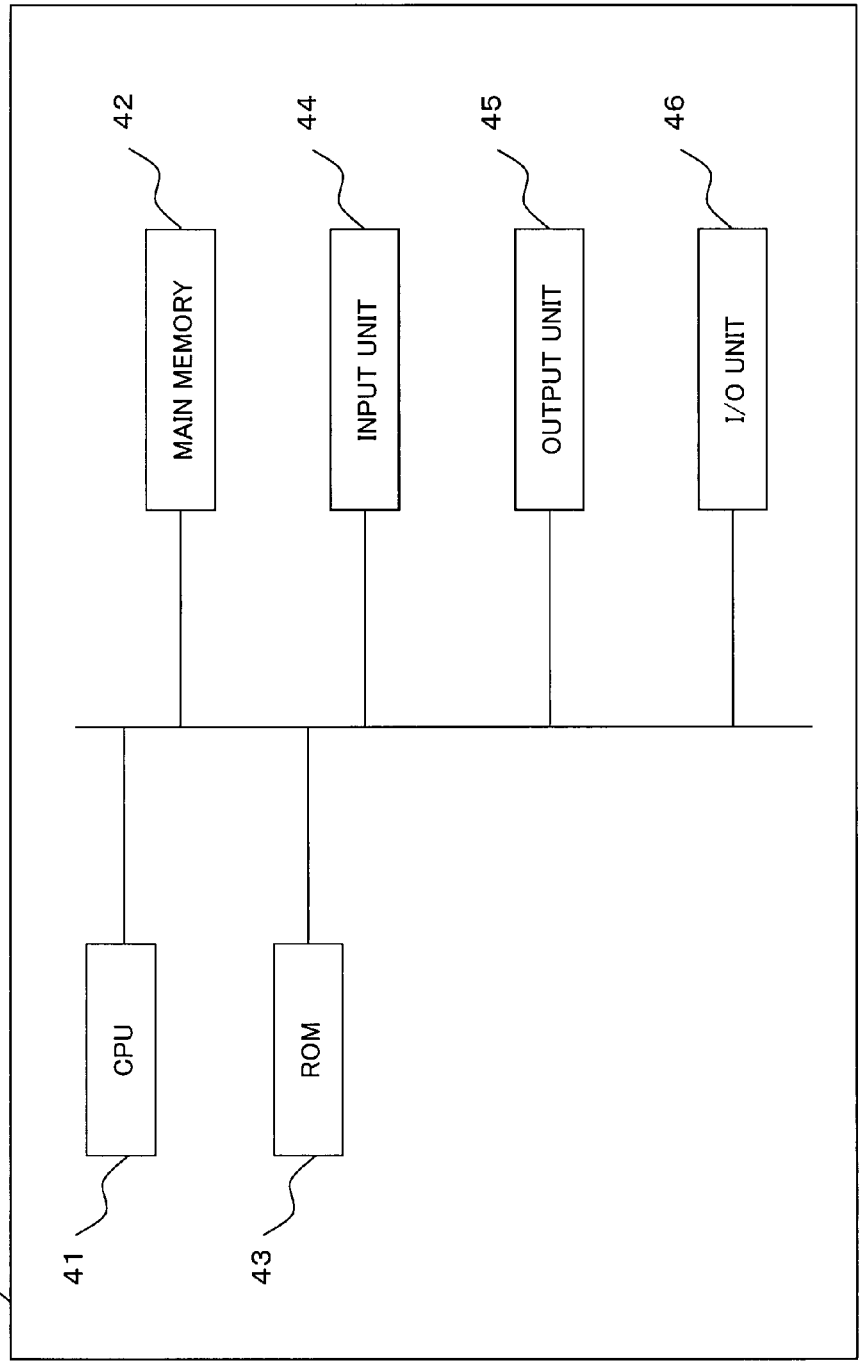

DOCUMENT CONTROL APPARATUS AND DOCUMENT CONTROL METHOD

This application is based upon and claims the benefit of priority from Japanese Patent Application No. 2012-183209, filed on Aug. 22, 2012, the disclosure of which is incorporated herein in its entirety by reference.

TECHNICAL FIELD

The present invention relates to a document control apparatus and, particularly, an apparatus, a method and a program which are capable of detecting a violation in document access authorization.

BACKGROUND ART

In Japanese Unexamined Patent Application Publication No. 2009-104646 (JP2009-104646A), there is disclosed a database system, which makes it possible to easily control and change document access authorities by controlling individual document files through organization information included in other systems, and correlating each of the documents with organizational attributes of each of users of the document.

In Japanese Unexamined Patent Application Publication No. 2004-54779 (JP2004-54779A), there is disclosed an access authority control system, which makes it easy to perform setting and control of access authorities in detail by determining whether or not a new applicant who desires to access a file is to be authorized, from attribute information in relation to users who are authorized to access the file.

In Japanese Unexamined Patent Application Publication No. 2005-85136 (JP2005-85136A), there is disclosed an administrative document control apparatus, which performs document control of individual documents and booklets by granting a suitable access authority to each of users in view of a division the user belongs to, a duty position of the user, and the like.

Nevertheless, when any of such technologies as implemented in the above-described pieces of citation literature is employed in a document control apparatus, it is difficult to efficiently perform an inspection for determining whether or not access authorities are granted to appropriate users or organizations with respect to each of documents. It is possible to perform this inspection for determining whether or not access authorities are granted appropriately, on a user-by-user basis. Nevertheless, in order to perform such an inspection for determining the appropriateness of access authorization for all users or organizations, a huge amount of time is needed.

In Japanese Unexamined Patent Application Publication No. 2009-104646, access authorities are controlled by using organization information included in other systems, but, merely, a determination as to whether or not an access authority is to be granted to each user who desires it is made.

In Japanese Unexamined Patent Application Publication No. 2004-54779, it is made possible to perform setting and control of access authorities in detail, but, merely, a determination as to whether or not an access authority is to be granted to each user who desires it is made.

In Japanese Unexamined Patent Application Publication No. 2005-85136, an inspection for determining whether a document access authority is to be granted to a user, or not, is performed on the basis of a division the user belongs to, a duty position of the user, and the like, but, the inspection is performed merely to determine whether or not the document access authority is to be granted to the user.

SUMMARY

An object of the present invention is to provide a document control apparatus and a document control method which make it possible to efficiently detect whether or not access authorities are granted to appropriate users or organizations with respect to each of documents.

A document control apparatus according to an exemplary aspect of the invention includes:

a document storage unit that stores therein a plurality of documents, for each of which access authorization is performed such that an access authority to access said each document is granted to a corresponding one of users of said each document or a corresponding one of at least one group said users belong to;

a duty position and organization information storage unit that stores therein duty position levels, which represent height levels of respective official positions with respect to said users;

a duty position information calculation unit that, for each of documents acquired from said document storage unit, calculates a duty-position level average, which is an average value of duty position levels of respective all of users who are authorized to access said each document acquired from said document storage unit, by using duty position levels acquired from said duty position and organization information storage unit, and further, calculates a duty-position level variation, which is a variance value of said duty position levels; and a single document detection unit that detects a document, for which said calculated duty-position level average is lower than a predetermined value and said calculated duty-position level variation is smaller than a predetermined value, as an illegitimate document for which there is a violation in said access authorization.

A method according to an exemplary aspect of the invention for detecting a violation in document access authorization, the method includes:

storing a plurality of documents, for each of which access authorization is performed such that an access authority to access said each document is granted to a corresponding one of users of said each document or a corresponding one of at least one group said users belong to, into document storage unit;

storing duty position levels, which represent height levels of respective official positions with respect to said users, into duty position and organization information storage unit;

for each of documents acquired from said document storage unit, calculating a duty-position level average, which is an average value of duty position levels of respective all of users who are authorized to access said each document acquired from said document storage unit, by using duty position levels acquired from said duty position and organization information storage unit, and further, calculating a duty-position level variation, which is a variance value of said duty position levels; and detecting a document, for which said calculated duty-position level average is lower than a predetermined value and said calculated duty-position level variation is smaller than a predetermined value, as an illegitimate document for which there is a violation in said access authorization.

BRIEF DESCRIPTION OF THE DRAWINGS

Exemplary features and advantages of the present invention will become apparent from the following detailed description when taken with the accompanying drawings in which:

FIG. 13 is a block diagram illustrating an example of a configuration of a document control apparatus according to a fifth exemplary embodiment.

EXEMPLARY EMBODIMENT

First Exemplary Embodiment

A first exemplary embodiment to practice the present invention will be described in detail with reference to the drawings.

Figure 1:
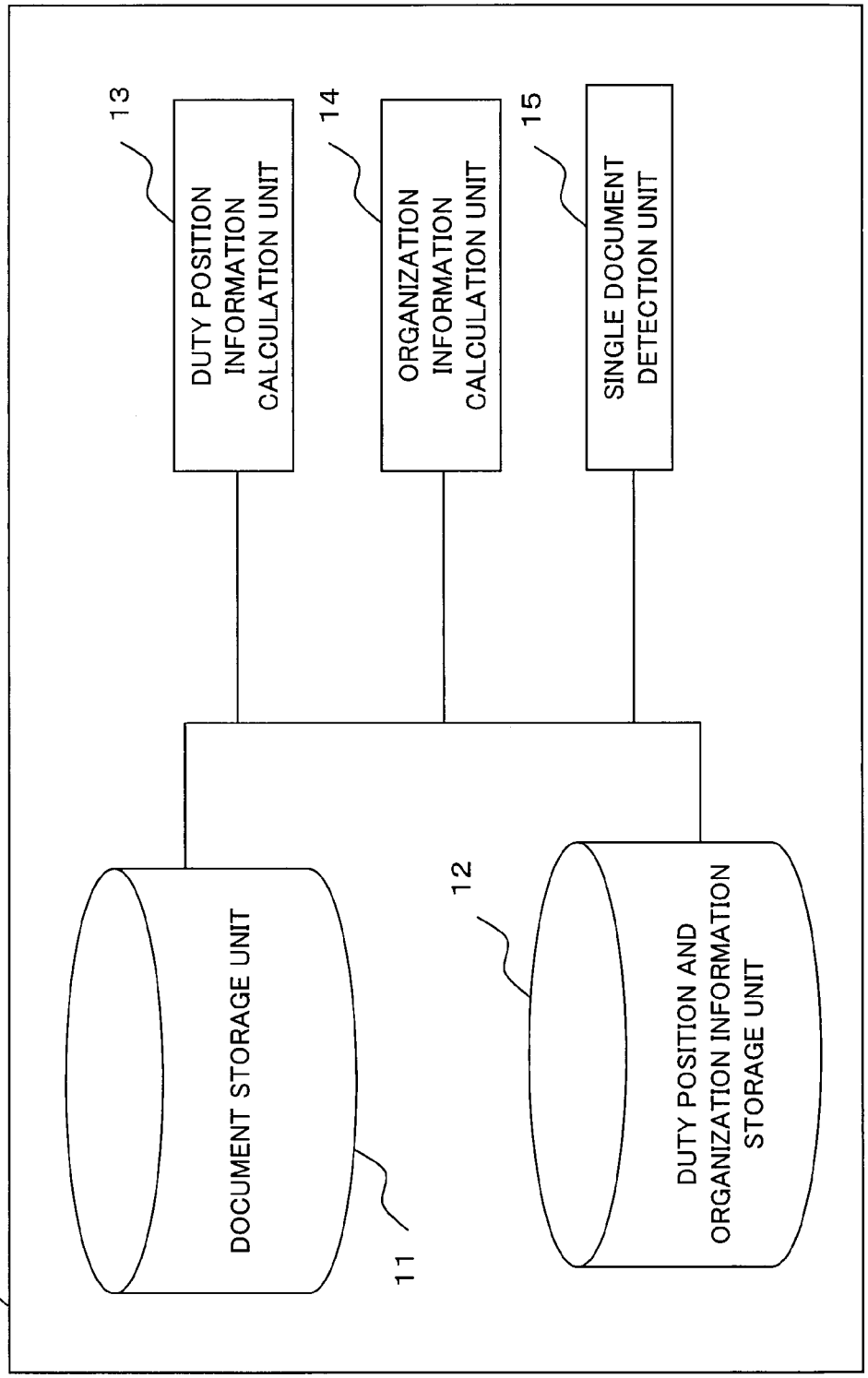
FIG. 1 is block diagram illustrating an example of a configuration of a document control apparatus according to a first exemplary embodiment.

FIG. 1 is a block diagram illustrating a configuration of a document access authorization violation detection apparatus 10 as an example of a document control apparatus. As shown in FIG. 1, the document access authorization violation detection apparatus 10 includes a document storage unit 11, a duty position and organization information storage unit 12, a duty position information calculation unit 13, an organization information calculation unit 14 and a single document detection unit 15. The document storage unit 11 and the duty position and organization information storage unit 12 are storage devices, such as memory disk devices or IC memories. In addition, a configuration of a document control apparatus according to an aspect of the present invention is not limited to this configuration of the document access authorization violation detection apparatus 10.

The document storage unit 11 stores therein documents (also referred to as document data) for each of which access authorization is performed such that an access authority to access the document is granted to a corresponding one of users of the document or a corresponding one of groups the users belong to.

In addition, an access authority setting circuit (not illustrated) grants the access authorities to access each of the documents.

The duty position and organization information storage unit 12 stores therein duty position levels representing corresponding height levels of users' official positions as well as group hierarchy information representing dependency relations among a plurality of groups.

The duty position information calculation unit 13 reads out a document from the document storage unit 11. Further, the duty position information calculation unit 13 acquires duty position levels, which result from digitizing height levels of corresponding official positions of users who are authorized to access the read-out document, from the duty position and organization information storage unit 12. Moreover, the duty position information calculation unit 13 calculates a duty-position level average which is an average value of all users' duty position levels, as well as a duty-position level variation which is a variance value corresponding to the duty-position level average of individual duty position levels, by using the acquired duty position levels. In this way, with respect to a document acquired from the document storage unit 11, the duty position information calculation unit 13 calculates, as a duty-position level variation, a variance value corresponding to a duty-position level average of duty position levels resulting from digitizing height levels of corresponding official positions of users who are authorized to access the acquired document.

The organization information calculation unit 14 acquires a piece of group hierarchy information, which indicates dependency relations among groups to which users who are authorized to access the acquired document belong to, from the duty position and organization information storage unit 12. Further, the organization information calculation unit 14 calculates inter-organization distances, which result from digitizing positional removes among the individual groups on the basis of the acquired group hierarchy information. Further, the organization information calculation unit 14 calculates, by using the calculated inter-organization distances, an inter-organization distance average, which is an average value of the inter-organization distances with respect to all the groups, as well as an inter-organization distance variation, which is a variance value corresponding to the inter-organization distance average of the individual inter-organization distances. In this way, with respect to a document acquired from the document storage unit 11, the organization information calculation unit 14 calculates an inter-organization distance variation, which is a variance value, by using inter-organization distances resulting from digitizing positional removes among individual groups on the basis of the group hierarchy information acquired from the duty position and organization information storage unit 12.

The single document detection unit 15 detects, for a single document, whether or not there is any violation in access authorization by using threshold values, on the basis of the results of the calculations performed by the duty position information calculation unit 13 or the results of the calculations performed by the organization information calculation unit 14. For example, the single document detection unit 15 acquires, for each of the documents, the results of the calculations performed by the duty position information calculation unit 13 or the results of the calculations performed by the organization information calculation unit 14. Further, the single document detection unit 15 compares the results of the calculations with corresponding predetermined threshold values, and on the basis of differences with the corresponding threshold values, it detects whether or not there is any violation in access authorization.

Here, the document storage unit 11 and the duty position and organization information storage units 12 each are a storage device, such as a disk device, a semiconductor memory device or the like.

Further, the duty position information calculation unit 13, the organization information calculation unit 14 and the single document detection unit 15 each are constituted by hardware, such as a logic circuit.

Further, the duty position information calculation unit 13, the organization information calculation unit 14 and the single document detection unit 15 each may be realized by causing a processor of the document access authorization violation detection apparatus 10 which is a computer to execute a program installed on memory which is not illustrated.

Figures 2, 3:
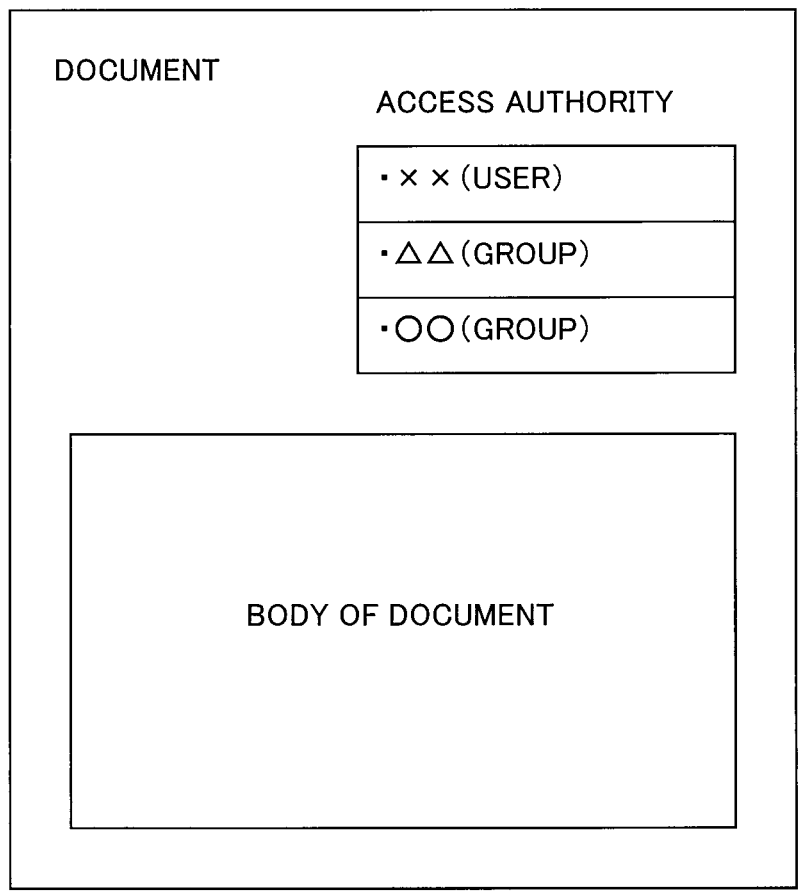
FIG. 2 is a diagram illustrating an example of a document including information related to access authorities having been granted.
FIG. 3 is a diagram illustrating an example of pieces of setting data (duty position levels) corresponding to respective official positions.

FIG. 2 is a diagram illustrating an example of a document including information related to access authorities having been granted. For each of documents stored in the document storage unit 11, the document access authorization violation detection apparatus 10 grants an access authority to access the document to each of users or to each of groups users belong to. The access authorities are stored in a document's header portion or the like.

FIG. 3 is a diagram illustrating an example of pieces of setting data (duty position levels) corresponding to respective official positions. Each of the pieces of setting data is data resulting from digitizing a height level of a corresponding official position (duty position) of a user who is authorized to access a relevant document, that is, it represents a duty position level of a user who is authorized to access a relevant document and, for example, this duty position level takes a larger numeric value as a height level of a corresponding official position (duty position) becomes higher. In addition, magnitude relations between height levels and numeric values with respect to respective official positions (duty positions) may be reversed. For example, the document access authorization violation detection apparatus 10 expresses pieces of setting data (duty position levels) corresponding to users' official positions (duty positions) by respective numeric values falling within a range from "0" to "1", and sets the duty position levels corresponding to respective official positions (duty positions), such as "a manager: 0.8", "a chief staff: 0.5" and "a staff: 0.2", as shown in FIG. 3.

Figure 4:
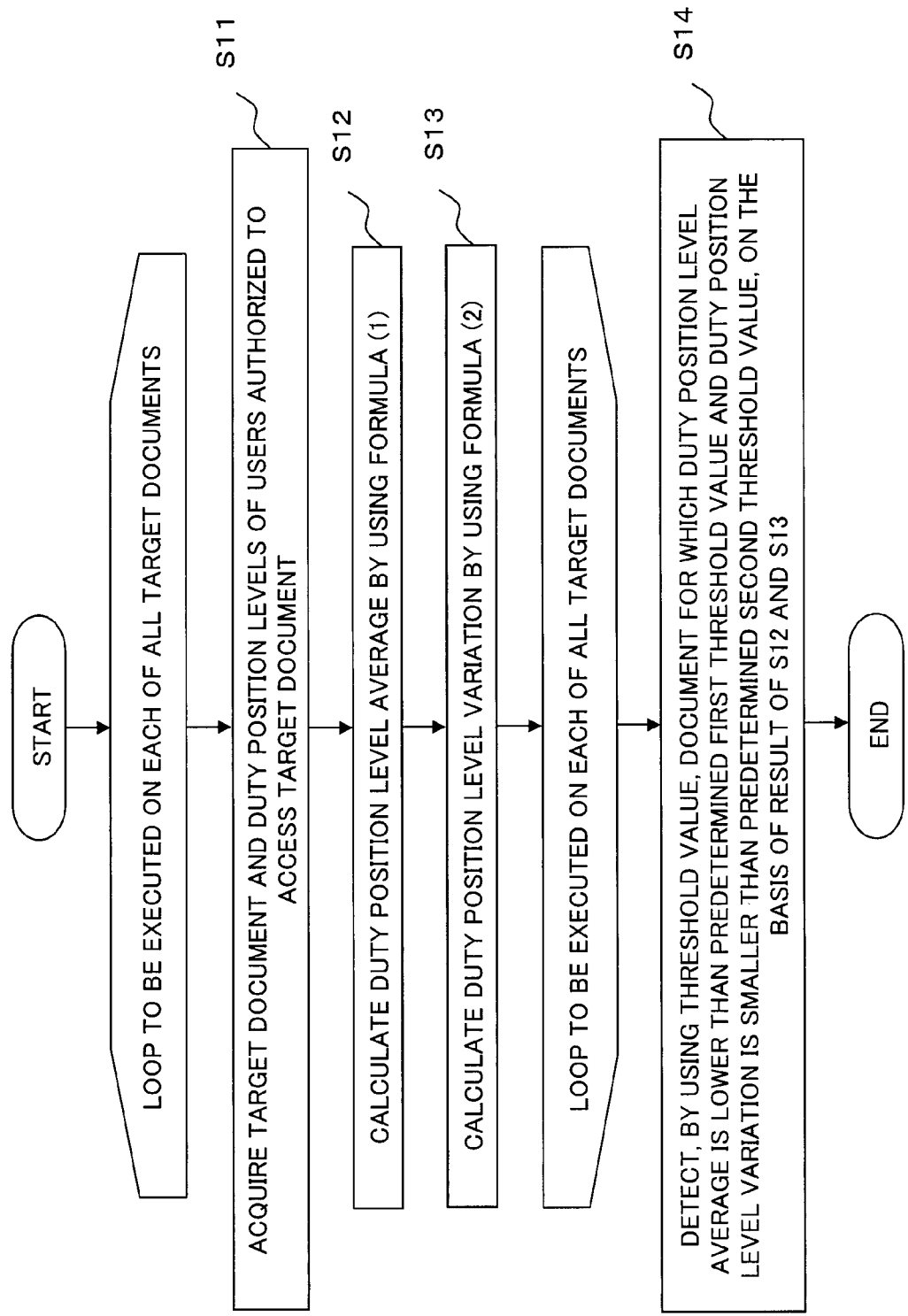
FIG. 4 is a flowchart illustrating a procedure for detecting an illegitimate document for which there is a violation in access authorization by using duty position levels.

FIG. 4 is a flowchart illustrating a procedure for detecting an illegitimate document, for which there is at least one violation in access authorization, by using duty position levels. The duty position information calculation unit 13 sequentially carries out steps S11 to S13 (hereinafter, referred to just as S11 to S13) on each of all target documents.

First, the duty position information calculation unit 13 acquires a document targeted for an inspection from the document storage unit 11. Further, the duty position information calculation unit 13 also acquires duty position levels of users who are authorized to access the document targeted for the inspection from the duty position and organization information storage unit 12 (S11).

Next, the duty position information calculation unit 13 calculates a duty-position level average, which is an average value of duty position levels of all users who are authorized to access the document, by using a formula (1) (S12).

$$DPLA = \frac{\sum_{X=1}^{AU} DPL(X)}{\text{Number\_of\_AU}} \quad (1)$$

where DPLA is a duty-position level average, AU is authorized users, DPL(X) is a duty position level of user-X, and Number of AU is the number of authorized users.

Next, the duty position information calculation unit 13 calculates a duty-position level variation, which is a variance value of duty position levels, by using a formula (2) on the basis of the result of the calculation using the formula (1) (S13).

$$DPLV = \frac{\sum_{X=1}^{AU} (DPL(X) - DPLA)^2}{\text{Number\_of\_AU}} \quad (2)$$

where DPLV is a duty-position level variation, AU is authorized users, DPL(X) is a duty position level of user-X, DPLA is a duty-position level average, and Number of AU is the number of authorized users.

In addition, in the case where, as the result of the calculation using the formula (2), the resultant duty-position level variation is large, this means that there are a large number of users whose duty position levels are largely different from the duty-position level average. Further, for example, in the case where, as the results of the calculations using the formula (1) and the formula (2), the resultant duty-position level average is low and the resultant duty-position level variation is small, this means that access authorities are disproportionately granted to users whose official positions are relatively low.

Moreover, on the basis of the results of the calculations in S12 and S13, the single document detection unit 15 detects documents by using threshold values, each of which has a duty-position level average lower than a first predetermined threshold value as well as a duty-position level variation smaller than a second predetermined threshold value, as documents for each of which inappropriate access authorization is likely to be performed (S14).

Figure 5:
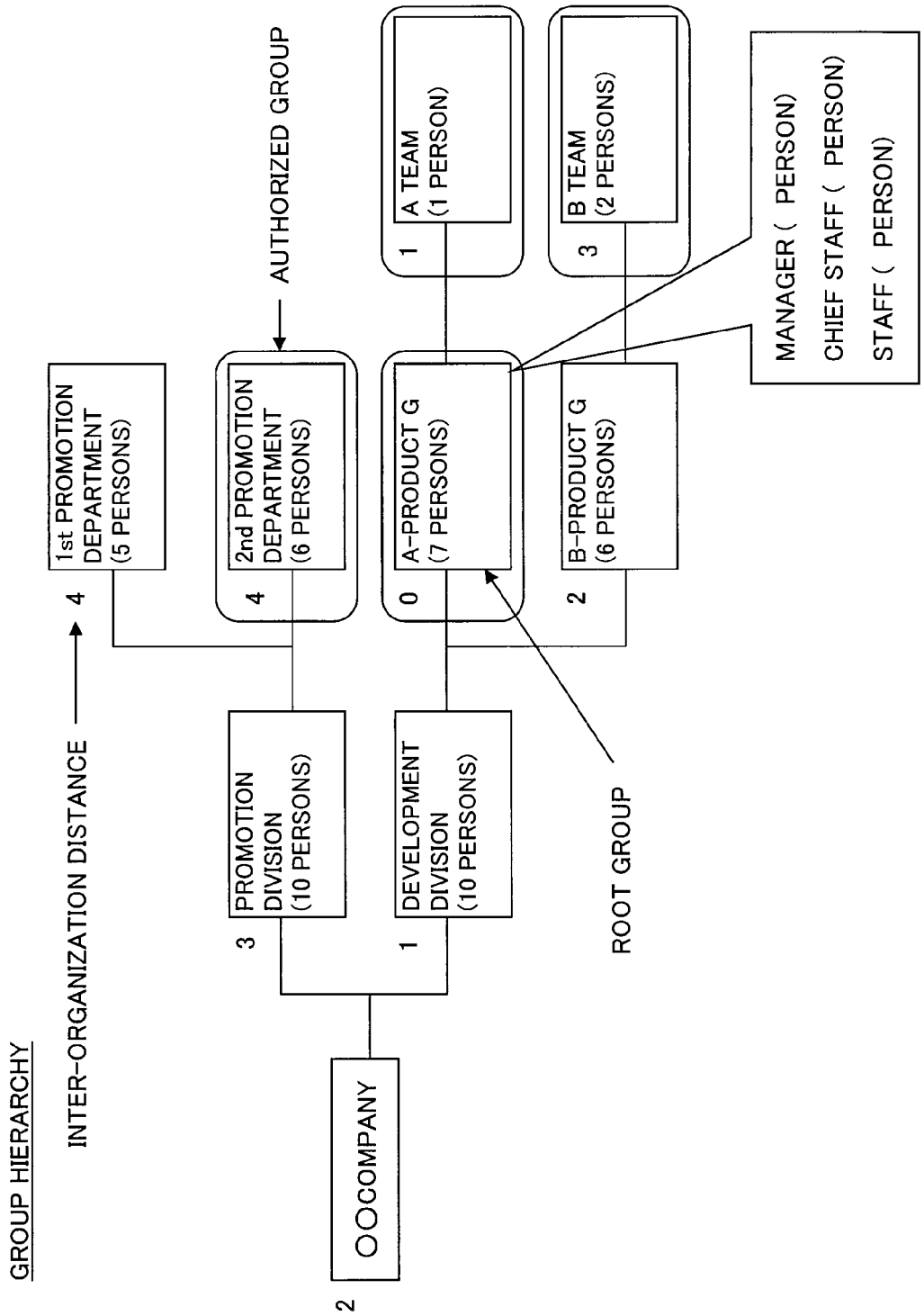
FIG. 5 is a conceptual diagram illustrating an example of a group hierarchy which represents dependency relations among a plurality of groups by a hierarchy (a tree-shaped structure).

FIG. 5 is a conceptual diagram illustrating an example of a group hierarchy which represents dependency relations among a plurality of groups by a hierarchy (a tree-like structure).

In FIG. 5, box-shaped frames denote groups, and names of the groups are indicated inside the frames. Further, portions, each further having a frame enclosing the box-shaped frame denoting a group, indicate groups which are authorized to access a relevant document. In addition, lines linking individual groups indicate connections of dependency relations among groups, and, for example, as shown in FIG. 5, part of lines indicates that lower-position groups (each having a roll as a child) of "a development division" (having a roll as a parent) are "A-product G" and "B-product G".

A route group is a group including more users than any other one of groups which are authorized to access a relevant document. In FIG. 5, the route group is "A-product G".

Further, the inter-organization distance indicates a group-structure based positional remove (a distance) from the route group to each of groups (in the case where a user is granted an access authority, a distance from the route group to a group the user belongs to). For example, as shown in FIG. 5, a distance between two groups having a parent-child relationship is set to "1", and a distance between two groups existing on the same hierarchy layer is set to the number of groups the route group is connected to via a common parent, and for example, a distance of between "A-product G" and "B-product G" is set to "2"

In addition, it is supposed that each group is independent of other groups existing on higher and lower hierarchy layers, and for example, a member number of any one of groups of "development division", "A-product G" and "A-team" does not include a member number of any one of the other groups.

Figure 6:
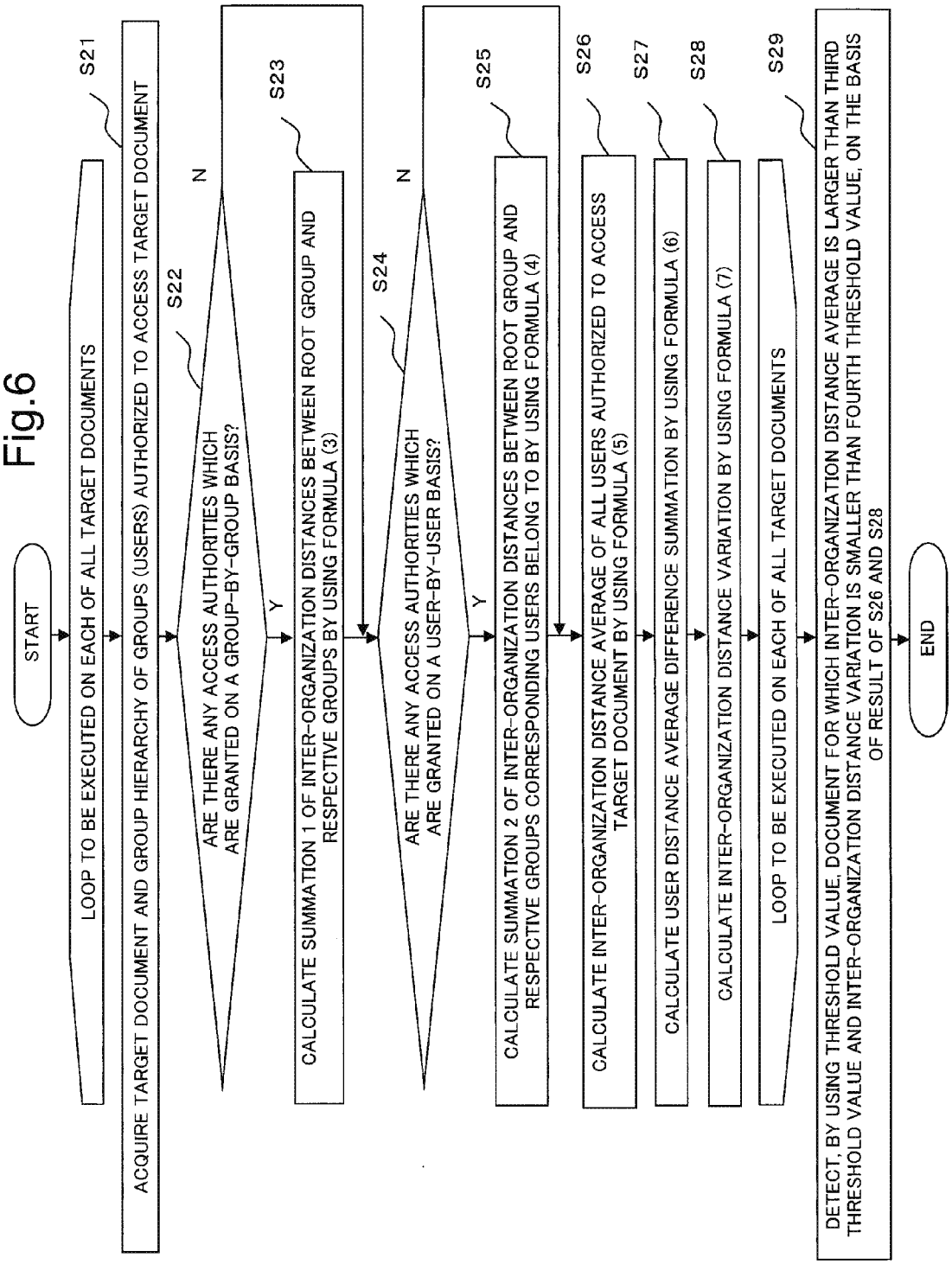
FIG. 6 is a flowchart illustrating a procedure for detecting an illegitimate document for which there is a violation in access authorization by using inter-organization distances.

FIG. 6 is a flowchart illustrating a procedure for detecting an illegitimate document, for which there is at least one violation in access authorization, by using inter-organization distances.

The organization information calculation unit 14 sequentially carries out S21 to S28 on each of all target documents.

First, the organization information calculation unit 14 acquires a document targeted for an inspection, from the document storage unit 11. Further, the organization information calculation unit 14 also acquires group hierarchy information, which indicates dependency relations among a plurality of groups which are authorized to access the document targeted for the inspection, from the duty position and organization information storage unit 12 (S21). In addition, the above-described group hierarchy information includes a route group and inter-organization distances.

Next, the organization information calculation unit 14 confirms whether or not there are any access authorities which are granted on a group-by-group basis (S22).

With respect to the access authorities which are granted on a group-by-group basis ("Y" in S22), the organization information calculation unit 14 calculates a summation 1 of inter-organization distances from the route group to respective corresponding groups by using a formula (3) (S23).

$$\text{Sum1\_of\_IOD} = \sum_{X=1}^{AG} (\text{IOD\_from\_RG\_to\_G}(X) \times \text{Number\_of\_G}(X)) \quad (3)$$

where Sum1 of IOD is a summation 1 of inter-organization distances, AG is authorized groups, IOD from RG to G(X) is an inter-organization distance from root group to group-X, and Number of G(X) is the number of members belonging to group-X.

Next, the organization information calculation unit 14 confirms whether or not there are any access authorities which are granted on a user-by-user basis (S24).

With respect to the access authorities which are granted on a user-by-user basis ("Y" in S24), the organization information calculation unit 14 calculates a summation 2 of inter-organization distances from the route group to respective groups the corresponding users belong to, by using a formula (4) (S25).

$$\text{Sum2\_of\_IOD} = \sum_{X=1}^{AU} (\text{IOD\_from\_RG\_to\_G}(X)) \quad (4)$$

where Sum2 of IOD is a summation 2 of inter-organization distances, AU is authorized users, and IOD from RG to G(X) is an inter-organization distance from root group to group-X a user belongs to.

Further, the organization information calculation unit 14 calculates an average of the inter-organization distances from the route group to respective groups to which all users authorized to access the target document belong by using a formula (5), on the basis of the results of the calculations using the formula (3) and the formula (4) (S26).

$$IODA = \frac{\text{Sum1\_of\_IOD} + \text{Sum2\_of\_IOD}}{\sum_{X=1}^{AG} \text{Number\_of\_G}(X) + \text{Number\_of\_AU}} \quad (5)$$

where IODA is an inter-organization distance average, Sum1 of IOD is a summation 1 of inter-organization distances, Sum2 of IOD is a summation 2 of inter-organization distances, AG is authorized groups, Number of G(X) is the number of members belonging to group-X, and Number of AU is the number of authorized users.

In addition, in the case where, as the result of the calculation using the formula (5), the resultant inter-organization distance average is large, this means that a large number of access authorities are granted to groups which are positioned largely apart from the route group (which is a majority group) in the group hierarchy.

Further, with respect to all users who are authorized to access the target document, on the basis of the result of the calculation using the formula (5), the organization information calculation unit 14 calculates, by using a formula (6), a summation of square sums of the differences between inter-organization distances from the route group to respective groups the users belong to and the inter-organization distance average (a result of this calculation being hereinafter referred to as a user distance average difference summation) (S27).

$$\text{Sum\_of\_UDAD} = \quad (6)$$

$$\sum_{X=1}^{AG} ((\text{IOD\_of\_G}(X) - IODA)^2 \times \text{Number\_of\_G}(X)) +$$

$$\sum_{X=1}^{AU} (\text{IOD\_of\_G}(X) - IODA)^2$$

where Sum of UDAD is a summation of user distance average differences, AG is authorized groups, IOD of G(X) is an inter-organization distance of group-X, IODA is an inter-organization distance average, Number of G(X) is the number of members belonging to group-X, AU is authorized users, IOD of G(X) is an inter-organization distance of group-X a user belongs to, and IODA is an inter-organization distance average.

Next, the organization information calculation unit 14 calculates an inter-organization distance variation by using the formula (7), which is a variance value of the inter-organization distances, corresponding to the inter-organization distance average, and which is obtained by dividing the user distance average difference summation, which has been calculated by using the formula (6), by the number of all the users who are authorized to access the target document (S28).

$$IODV = \frac{\text{Sum\_of\_UDAD}}{\sum_{X=1}^{AG} \text{Number\_of\_G}(X) + \text{Number\_of\_AU}} \quad (7)$$

where IODV is an inter-organization distance variation, Sum of UDAD is a summation of user distance average differences, AG is authorized groups, Number of G(X) is the number of members belonging to group-X, and Number of AU is the number of authorized users.

In addition, in the case where, as the result of the calculation using the formula (7), the resultant inter-organization distance variation is large, this means that there are a large number of users who belong to organizations whose inter-organization distances are larger as compared with the inter-organization distance average. Further, in the case where, as the results of the calculations using the formula (5) and the formula (7), for example, the resultant inter-organization distance average is large and the resultant inter-organization distance variation is small, this means that access authorities are disproportionately granted to users belonging to groups which are positioned largely apart from the root group (the majority group).

Moreover, on the basis of the results of S26 and S28, the single document detection unit 15 detects, by using threshold values, documents for each of which the resultant inter-organization distance average is larger than a third threshold value and the resultant inter-organization distance variation is smaller than a fourth threshold value (S29). The detected documents are ones which are likely to be illegitimate documents for each of which there is at least one violation in access authorization.

The document access authorization violation detection apparatus 10 according to this exemplary embodiment brings about an advantageous effect described below.

The document access authorization violation detection apparatus 10 makes it possible to efficiently detect whether or not there is any violation in access authorization with respect to each of documents.

A reason for this is that the document access authorization violation detection apparatus 10 detects, for each of documents, whether or not there is any violation in access authorization to access the document, by using statistical values calculated from duty position levels, which represents height levels of corresponding official positions of users who are authorized to access the document, or inter-organization distances, which are obtained by digitizing inter-organization positional removes from respective groups, to which the users belong, to a group whose member number is larger than any other one of the groups.

Second Exemplary Embodiment

A second exemplary embodiment to practice the present invention will be described in detail with reference to the drawings.

Figure 7:
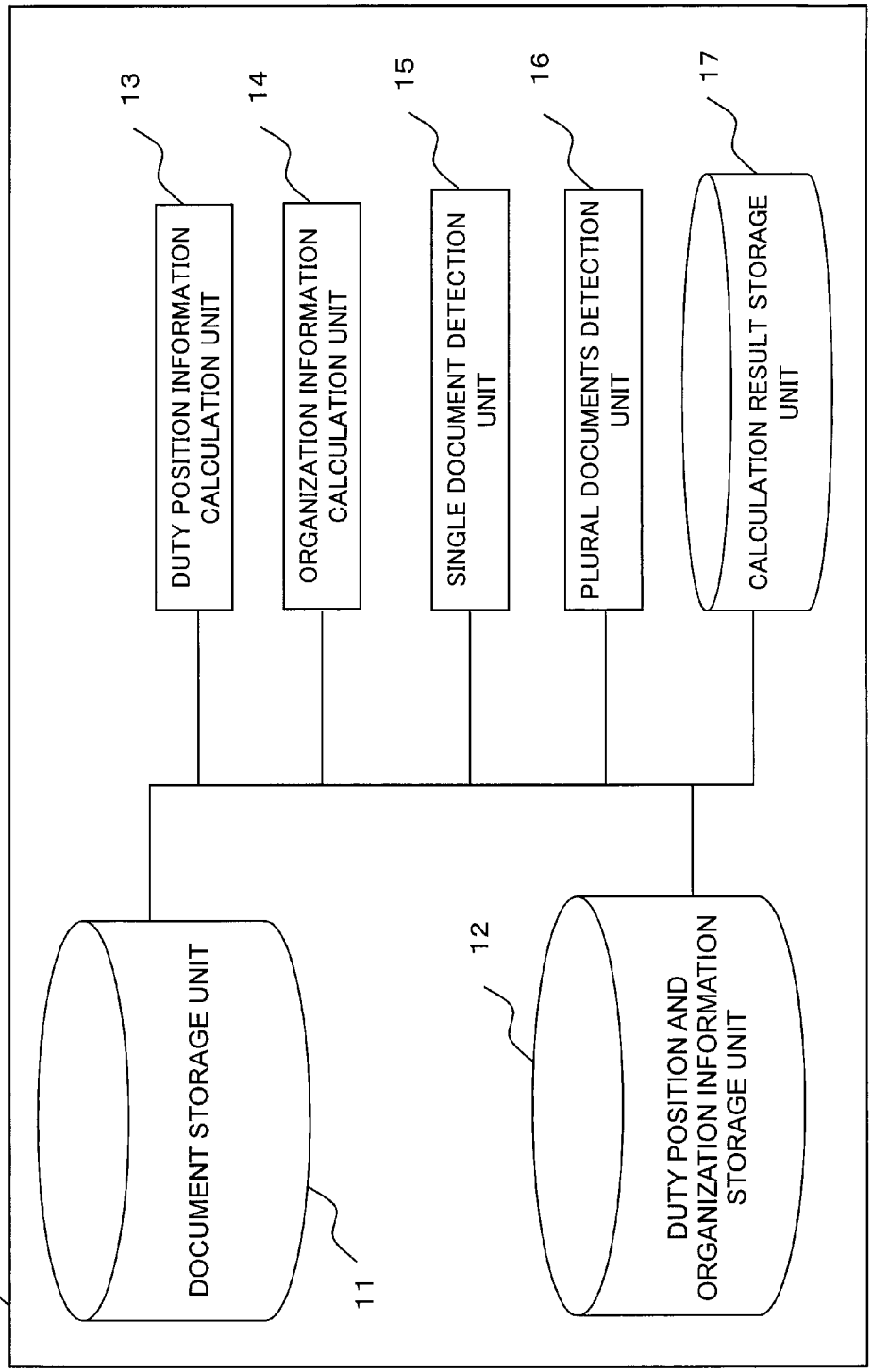
FIG. 7 is a block diagram illustrating an example of a configuration of a document control apparatus according to a second exemplary embodiment.

FIG. 7 is a block diagram illustrating a configuration of a document access authorization violation detection apparatus 20 which is an example of a document control apparatus according to this second exemplary embodiment. In this exemplary embodiment, a plural documents detection unit 16 and a calculation result storage unit (or storage device) 17 are added to the configuration of the document access authorization violation detection apparatus 10 according to the first exemplary embodiment.

The plural documents detection unit 16 stores, for each of documents, the duty-position level average or the inter-organization distance average into the calculation result storage unit 17, the duty-position level average and the inter-organization distance average having been calculated by the duty position information calculation unit 13 and the organization information calculation unit 14, respectively, on the basis of information acquired from the document storage unit 11 and the duty position and organization information storage unit 12. Moreover, the plural documents detection unit 16 performs a comparison between every two adjacent documents in the up and down direction, and a comparison between every two adjacent documents in the left and right direction on (i.e., a comparison between every two adjacent documents existing on the same hierarchy layer), by using document hierarchy information (shown in FIG. 8 described below) having been acquired from the document storage unit 11, and thereby detects at least one illegitimate document for each of which there is at least one violation in access authorization.

Here, the plural documents detection unit 16 is constituted by hardware, such as a logic circuit. Further, the calculation result storage unit 17 is a storage device, such as a disk device or a semiconductor memory device.

The plural documents detection unit 16 may be realized by causing a processor included in the document access authorization violation detection apparatus 10 which is a computer to execute a program installed on memory which is not illustrated.

Figure 8:
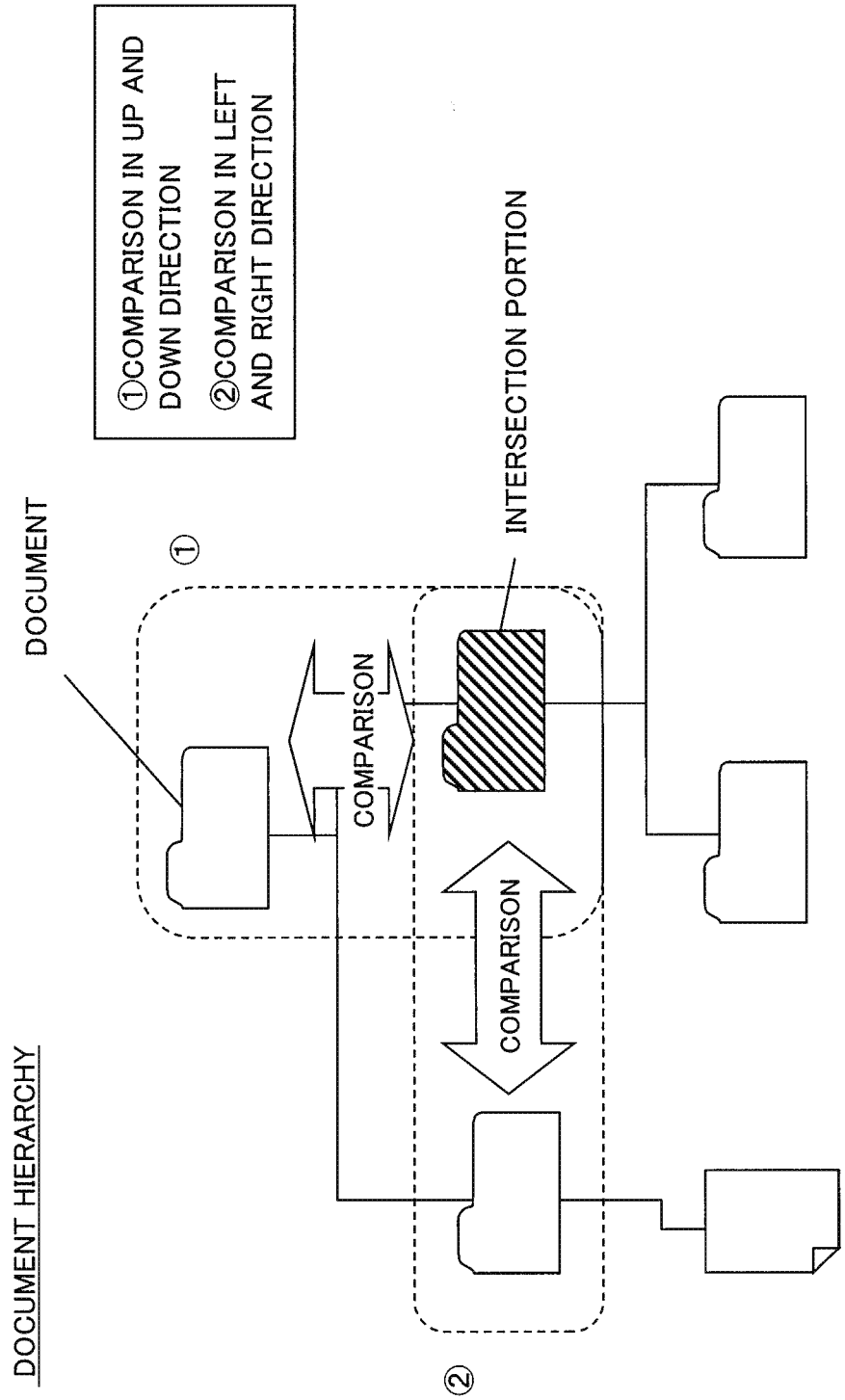
FIG. 8 is a conceptual diagram illustrating an example of a document hierarchy which represents dependency relations among a plurality of documents by a hierarchy (a tree-shaped structure).

FIG. 8 is a conceptual diagram conceptually illustrating an example of document hierarchy information which represents dependency relations among a plurality of documents by a hierarchy (a tree-shaped structure). In this exemplary embodiment, as shown in FIG. 8, a plurality of documents included in document hierarchy information which is managed in the form of a hierarchy (a tree-shaped structure) is targeted. The dependency relations among individual documents are represented by straight lines connecting the individual documents. Further, with respect to each of the documents, there exist different documents which are adjacent to the document in the up and down direction, and different documents which are adjacent thereto in the left and right direction (i.e., different documents which exists on the same hierarchy layer).

The plural documents detection unit 16 inspects whether or not there is any violation in access authorization with respect to each of documents existing on all hierarchy layers in the document hierarchy information, on the basis of values having been calculated by the duty position information calculation unit 13 or the organization information calculation unit 14.

In an inspection using the duty-position level averages, in the case where, with respect to any two documents which are located adjacent to each other in the up and down direction in the document hierarchy, a value of the lower layer document thereof (i.e., a duty-position level average value with respect to the lower layer document thereof) is larger than a value of the upper layer document thereof (i.e., a duty-position level average value with respect to the upper layer document thereof), or in the case where, with respect to any two documents which are located adjacent to each other in the left and right direction in the document hierarchy, a difference between values of the respective two adjacent documents is larger than a predetermined value (a threshold value), the plural documents detection unit 16 detects the two documents existing at respective adjacent hierarchy layers as a pair of adjacent documents for which there is at least one violation in access authorization.

In an inspection using inter-organization distance averages, in the case where, with respect to any two documents which are located adjacent to each other in the up and down direction in the document hierarchy, a value of the lower layer document thereof is larger than a value of the upper layer document thereof, or in the case where, with respect to any two documents which are located adjacent to each other in the left and right direction in the document hierarchy information, a difference between values of the respective two adjacent documents is larger than a predetermined value, the plural documents detection unit 16 detects the two adjacent documents as a pair of adjacent documents for which there is at least one violation in access authorization.

Moreover, when having detected that there is at least one violation in access authorization with respect to each of a pair of documents which are adjacent to each other in the up and down direction and a pair of documents which are adjacent to each other in the left and right direction, and these pairs of adjacent documents intersect with each other, the plural documents detection unit 16 may detect a document corresponding to a portion at which the two pairs of adjacent documents intersect with each other (the hatched portion being an intersection portion shown in FIG. 8) as an illegitimate document for which there is at least one violation in access authorization. Since there is highly likely to exist a violation in each of these documents, a display unit (not illustrated) makes, for example, a strong warning indication under a direction from the plural documents detection unit 16.

Figure 9:
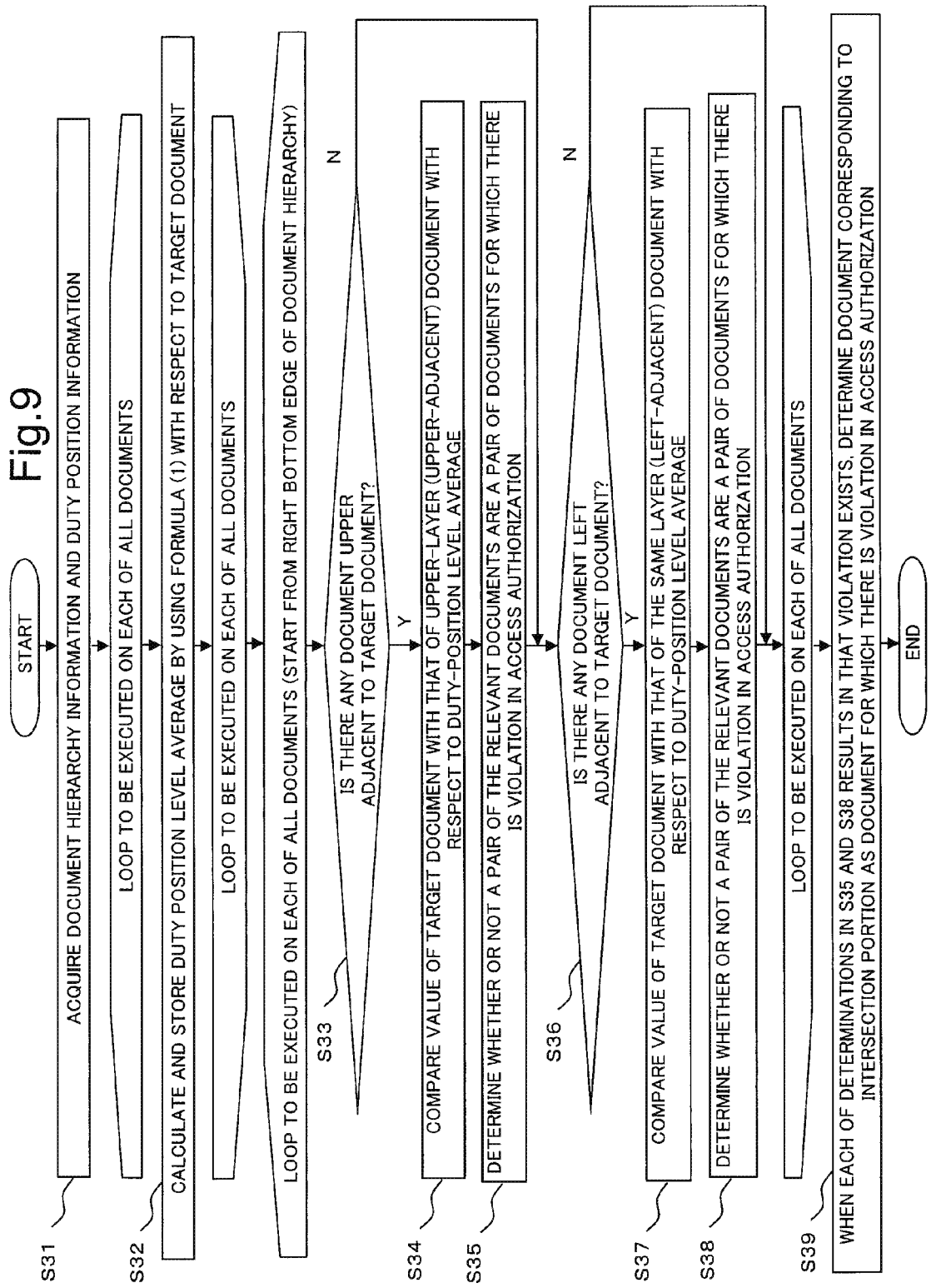
FIG. 9 is a flowchart illustrating a procedure for comparing duty-position level averages of a respective plurality of documents which are managed in the form of a document hierarchy.

FIG. 9 is a flowchart illustrating a procedure for comparing duty-position level averages with respect to a plurality of documents which is managed in the form of a document hierarchy.

First, the duty position information calculation unit 13 acquires information related to a document hierarchy and information related to duty position levels from the document storage unit 11 and the duty position and organization information storage unit 12, respectively (S31).

The duty position information calculation unit 13 calculates duty-position level averages by using the formula (1) with respect to respective all target documents on the basis of the acquired information, and stores the calculated duty-position level average into the calculation result storage unit 17 (S32).

Next, the duty position information calculation unit 13 sequentially carries out S33 to S38 with respect to each of all target documents included in the document hierarchy.

First, the plural documents detection unit 16 confirms whether or not there exists a document which is located upper adjacent to a target document in the document hierarchy (S33).

In the case of "Y" in (S33), the plural documents detection unit 16 compares a duty-position level average value of the target document with that of the upper layer (the upper adjacent) document (S34).

As the result of S34, in the case where, with respect to the two documents which are located adjacent to each other in the up and down direction in the document hierarchy, the duty-position level average value of the lower layer document thereof is higher than that of the upper layer document thereof, the plural documents detection unit 16 determines the two adjacent documents as a pair of documents for which there is at least one violation in access authorization (S35).

Further, similarly, with respect to documents existing at the left and right sides of a target document in the hierarchy structure (i.e., documents existing on the same hierarchy layer), the plural documents detection unit 16 also confirms whether or not there exists a document which is located left adjacent to the target document (S36).

In the case of "Y" in S36, the plural documents detection unit 16 compares a duty-position level average value of the target document with that of the same layer (the left adjacent) document (S37).

As the result of S37, in the case where, with respect to the two documents which are located adjacent to each other in the left and right direction in the document hierarchy, a difference between the duty-position level average values of the two adjacent documents is larger than a predetermined threshold value, the plural documents detection unit 16 determines the two adjacent documents as a pair of documents for which there is at least one violation in access authorization (S38).

Moreover, in the case where two pairs of adjacent documents have been detected in S35 and S38, and the two pairs of the adjacent documents intersect with each other, the plural documents detection unit 16 determines a document corresponding to a portion at which the two pairs of adjacent documents intersect with each other (i.e., a document belonging to both of the two pairs of adjacent documents) as a document for which there is at least one violation in access authorization (S39).

In addition, in this exemplary embodiment, the determination as to whether or not there is at least one violation in access authorization is made on an assumption that, as a position of a hierarchy layer on which a document exists becomes higher in the document hierarchy, levels of duty positions which are authorized to access the document become higher.

In addition, the plural documents detection unit 16 may report all documents belonging to pairs or a pair having been detected in (S35) and/or (S38) as illegitimate documents, without carrying out S39.

Figure 10:
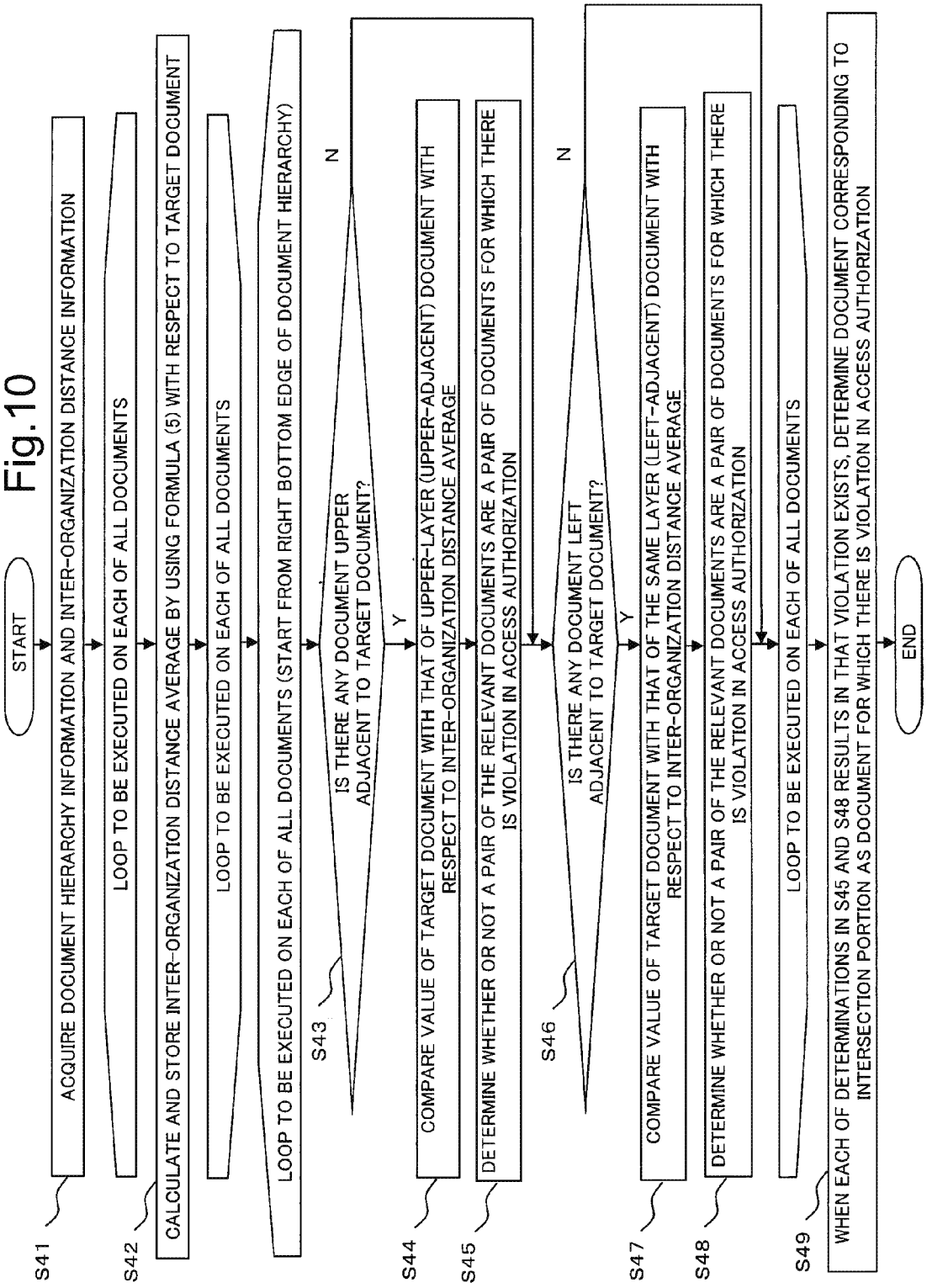
FIG. 10 is a flowchart illustrating a procedure for comparing inter-organization distance averages of a respective plurality of documents which is managed in the form of a document hierarchy.

FIG. 10 is a flowchart illustrating a procedure for comparing inter-organization distance averages with respect to a plurality of documents which is managed in the form of a document hierarchy.

Here, FIG. 10 illustrates an example in which a document for which there is at least one violation in access authorization is detected by comparing inter-organization distance averages as substitute for the above duty-position level averages.

First, the organization information calculation unit 14 acquires information related to a target document hierarchy and information related to inter-organization distances from the document storage unit 11 and the duty position and organization information storage unit 12, respectively (S41).

The organization information calculation unit 14 calculates inter-organization distance averages by using the formula (5) with respect to respective all target documents on the basis of the acquired information, and stores the calculated inter-organization distance averages into the calculation result storage unit 17 (S42).

In addition, the organization information calculation unit 14 sequentially carries out S43 to S48 with respect to each of all target documents included in the document hierarchy.

First, the plural documents detection unit 16 confirms whether or not there exists a document which is located upper adjacent to a target document in the document hierarchy (S43).

In the case of "Y" in S43, the plural documents detection unit 16 compares an inter-organization distance average value of the target document with that of the upper layer (the upper adjacent) document (S44).

As the result of S44, in the case where, with respect to the two documents which are located adjacent in the up and down direction in the document hierarchy, the inter-organization distance average value of the lower layer document thereof is larger than that of the upper layer document thereof, the plural documents detection unit 16 determines the two adjacent documents as a pair of adjacent documents for which there is at least one violation in access authorization (S45).

Further, similarly, with respect to documents existing at the left and right sides of a target document in the hierarchy structure (i.e., documents existing on the same hierarchy layer), the plural documents detection unit 16 also confirms whether or not there exists a document which is located left adjacent to the target document (S46).

In the case of "Y" in S46, the plural documents detection unit 16 compares an inter-organization distance average value of the target document with that of the same layer (the left adjacent) document (S47).

As the result of S47, in the case where a difference between the inter-organization distance average values of the two documents which are located adjacent to each other in the left and right direction in the document hierarchy is larger than a predetermined threshold value, the plural documents detection unit 16 determines the two adjacent documents as a pair of adjacent documents for which there is at least one violation in access authorization (S48).

Moreover, in the case where two pairs of adjacent documents have been detected in S45 and S48, and the two pairs of the adjacent documents intersect with each other, the plural documents detection unit 16 determines a document corresponding to a portion at which the two pairs of adjacent documents intersect with each other (i.e., a document belonging to both of the two pairs of adjacent documents) as a document for which there is at least one violation in access authorization (S49).

In addition, in this exemplary embodiment, the determination as to whether or not there is at least one violation in access authorization is made on an assumption that, as a position of a hierarchy layer on which a document exists becomes higher in the document hierarchy, groups which are authorized to access the document are more widely spread.

In addition, the plural documents detection unit 16 may report all documents belonging to pairs or a pair having been detected in S45 and/or S48 as illegitimate documents, without carrying out S49.

The document access authorization violation detection apparatus 20 according to this exemplary embodiment brings about an advantageous effect described below.

In a document hierarchy indicating dependency relations among a plurality of documents, the document access authorization violation detection apparatus 20 enables detection of at least one illegitimate document for which there is at least one violation in access authorization.

A reason for this is that, with respect to respective documents included in a document hierarchy, duty-position level averages or inter-organization distance averages are calculated, and a comparison of the duty-position level averages or the inter-organization distance averages is made between every two documents which are located adjacent to each other in the up and down direction in the document hierarchy, and/or between every two documents which are located adjacent to each other in the left and right direction in the document hierarchy.

Third Exemplary Embodiment

A third exemplary embodiment to practice the present invention will be described in detail with reference to the drawings.

Although this exemplary embodiment is configured just like the case of the second exemplary embodiment (FIG. 7), this exemplary embodiment is characterized in that, with respect to an identical document, a calculation result stored in the calculation result storage unit 17 is time-serially compared with a calculation result after an elapse of a period of time, and thereby at least one document for each of which there is at least one violation in access authorization is detected.

Figure 11:
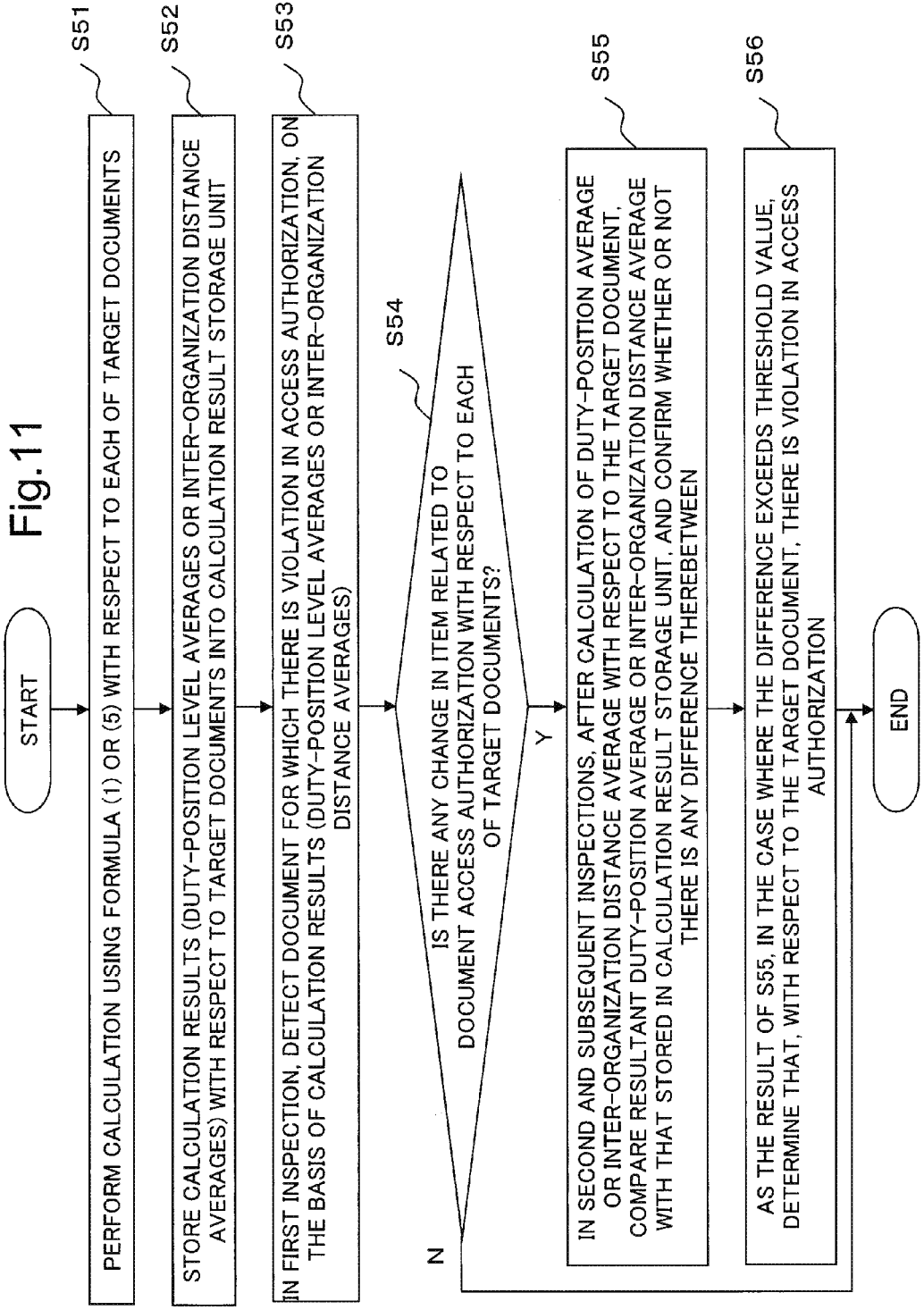
FIG. 11 is a flowchart illustrating an operation of a third exemplary embodiment.

FIG. 11 is a flowchart illustrating an operation of this third exemplary embodiment.

First, with respect to each of target documents, the duty position information calculation unit 13 performs calculation using the formula (1), or the organization information calculation unit 14 performs calculation using the formula (5) (S51).

Next, the duty position information calculation unit 13 stores the calculation result (a duty-position level average) of the target document into the calculation result storage unit 17, or the organization information calculation unit 14 stores the calculation result (an inter-organization distance average) of the target document into the calculation result storage unit 17 (S52).

In a first inspection, the single document detection unit 15 detects at least one document for each of which there is at least one violation in access authorization, in accordance with the procedure shown in FIG. 4 or the procedure shown in FIG. 6 (S53).

Afterwards, with respect to each of the target documents, the single document detection unit 15 confirms whether or not there is any change in each of items related to document access authorization, such as a setting of groups which are authorized to access the target document (S54).

In the case of "Y" in S54, in a second and subsequent inspections, with respect to the target document in which there is a change in any of items related to document access authorization, the duty position information calculation unit 13 calculates a duty-position level average, or the organization information calculation unit 14 calculates an inter-organization distance average, and then, the single document detection unit 15 compares the new calculation result with a previous duty-position level average or a previous inter-organization distance average, which was stored into the calculation result storage unit 17 in the first inspection, and thereby confirms whether or not there is any difference therebetween (S55).

Moreover, in the case where, as the result of S55, the difference exceeds a threshold value, the single document detection unit 15 determines that, with respect to the target document in which there is a change in any of items related to document access authorization, there is at least one violation in access authorization (S56).

The document access authorization violation detection apparatus 20 according to this exemplary embodiment brings about an advantageous effect described below.

The document access authorization violation detection apparatus 20 makes it possible to efficiently detect a violation in access authorization with respect to each of documents.

A reason for this is that, duty-position level averages or inter-organization distance averages resulting from calculations in a first inspection are stored, and in a second and subsequent inspections, only duty-position level averages or inter-organization distance averages, which result from calculations on documents in each of which there is a change in any of items related to document access authorization, are compared with corresponding ones of the duty-position level averages or the inter-organization distance averages resulting from calculations in the first inspection, and thereby, at least one document, in each of which there is at least one violation in providing access restrictions, is detected.

Fourth Exemplary Embodiment

A fourth exemplary embodiment to practice the present invention will be described in detail with reference to the drawings.

Figure 12:
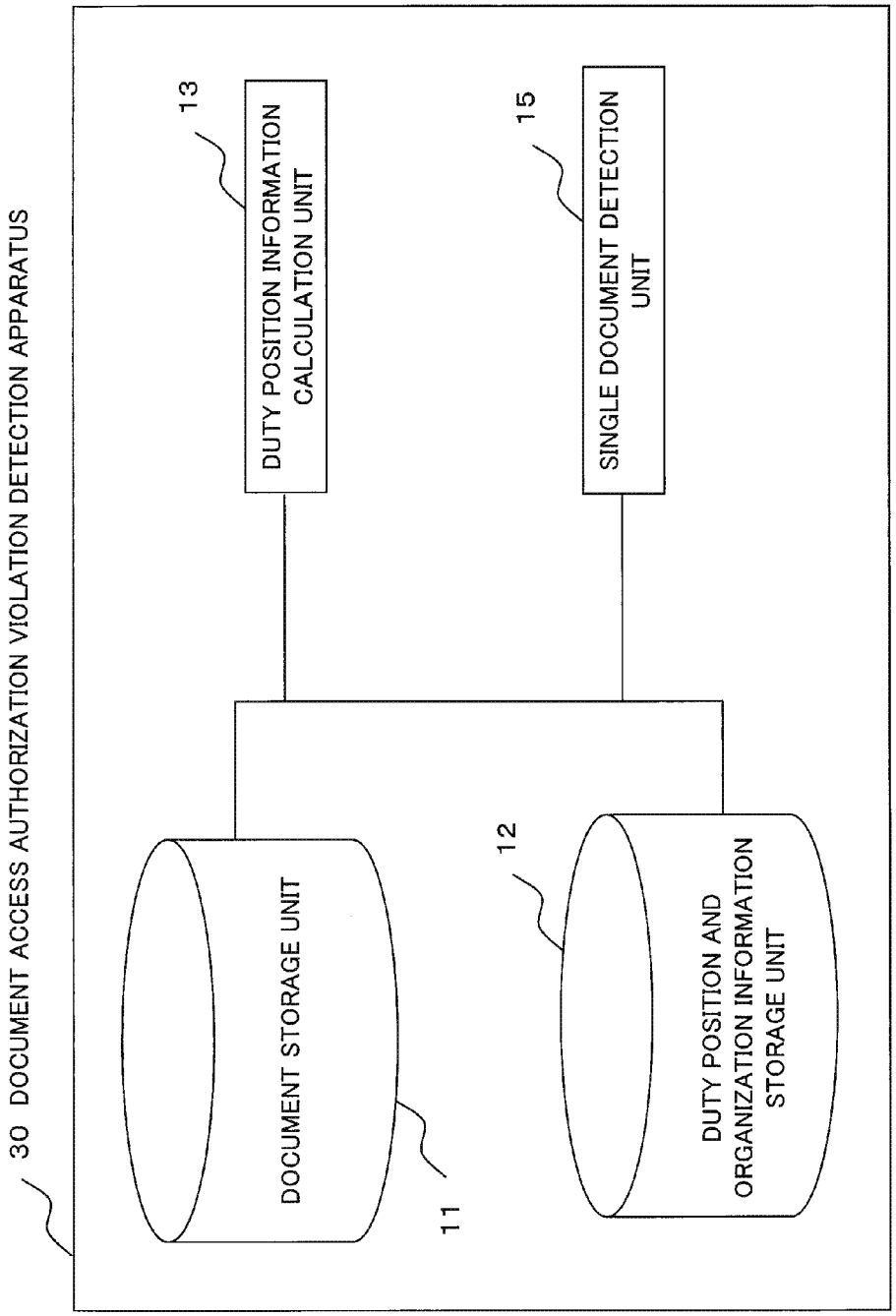
FIG. 12 is a block diagram illustrating an example of a configuration of a document control apparatus according to a fourth exemplary embodiment.

FIG. 12 is a block diagram illustrating a configuration of a document access authorization violation detection apparatus 30 which is an example of a document control apparatus according to a fourth exemplary embodiment.

The document access authorization violation detection apparatus 30 includes a document storage unit 11, a duty position and organization information storage unit 12, a duty position information calculation unit 13 and a single document detection unit 15.

The document storage unit 11 stores therein documents for each of which access authorization is performed such that an access authority to access the document is granted to a corresponding one of users of the document or a corresponding one of groups the users belong to.

The duty position and organization information storage unit 12 stores therein duty position levels representing corresponding height levels of users' official positions as well as group hierarchy information representing dependency relations among a plurality of groups.

With respect to a document acquired from the document storage unit 11, on the basis of duty position levels acquired from the duty position and organization information storage unit 12, the duty position levels being obtained by digitizing height levels of respective official positions of users who are authorized to access the document, the duty position information calculation unit 13 calculates a duty-position level average which is an average value of the duty position levels of all the users, as well as a duty-position level variation which is a variance value corresponding to the duty-position level average of the individual duty position levels.

The single document detection unit 15 detects, with respect to a single document, whether or not there is any violation in access authorization by using threshold values, on the basis of the result of calculation having been performed by the duty position information calculation unit 13.

The document access authorization violation detection apparatus 30 according to this exemplary embodiment brings about an advantageous effect described below.

The document access authorization violation detection apparatus 30 makes it possible to efficiently detect whether or not there is any violation in access authorization with respect to each of documents.

A reason for this is that the document access authorization violation detection apparatus 30 detects, for each of documents, whether or not there is any violation in access authorization to access the document, by using statistical values resulting from calculations from duty position levels representing height levels of respective official positions of users who are authorized to access the document.

Fifth Exemplary Embodiment

A fifth exemplary embodiment to practice the present invention will be described in detail with reference to the drawings.

FIG. 13 is a block diagram illustrating an example of a configuration of a document control apparatus according to a fifth exemplary embodiment.

Further, FIG. 13 illustrates an example of a circuit which allows a computer to realize any one of respective document control apparatuses according to the first to fourth exemplary embodiments.

A document access authorization violation detection apparatus 40 is a computer including a CPU 41, a main memory 42, a ROM (read only memory) 43, an input unit 44, an output unit 45 and an I/O (interface) unit 46.

The CPU 41 reads a program stored in the ROM 43 into the main memory 42, and executes the program. The main memory 42 temporarily retains data for the program executed by the CPU 41. The ROM 43 stores the program therein.

For example, the CPU 41, the ROM (read only memory) 43, the input unit 44 and the output unit 45 function as the duty position information calculation unit 13, the organization information calculation unit 14 and the single document detection unit 15 which are included in the document access authorization violation detection apparatus 10 shown in FIG. 1. The main memory 42 functions as the document storage unit 11 and the duty position and organization information storage unit 12. Further, an auxiliary storage device, such as a hard disk device, which is not illustrated, may also function as the document storage unit 11 and the duty position and organization information storage unit 12. The CPU 41 carries out processes included in the flowcharts shown in FIG. 4 and FIGS. 9 to 11 on the basis of the program.

The input unit 44 is a unit to input data necessary to execute the program. For example, the input unit 44 may be a keyboard, a touch panel operation device, or a data reading device, such as a card reader. The output unit 45 outputs data resulting from execution of the program. The output unit 45 includes, for example, a display device and a printer. The I/O unit 46 carries out transmission and reception of input/output data with external of the document access authorization violation detection apparatus 40.

According to this exemplary embodiment, the same advantageous effects as those of the first to fourth exemplary embodiments can be obtained.

Hereinbefore, the present invention has been described with reference to exemplary embodiments, but, the present invention is not limited to the aforementioned exemplary embodiments. Various changes, which can be understood by the skilled in the art, can be made on the configuration and the details of the present invention within a scope of the present invention.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A document control apparatus comprising:
a document storage circuit that stores therein a plurality of documents, for each of which access authorization is performed such that an access authority to access said each document is granted to a corresponding one of users of said each document or a corresponding one of at least one group said users belong to;
a duty position and organization information storage circuit that stores therein duty position levels, which represent height levels of respective official positions with respect to said users;
a duty position information calculation circuit that, for each of documents acquired from said document storage circuit, calculates a duty-position level average, which is an average value of duty position levels of respective all of users who are authorized to access said each document acquired from said document storage circuit, by using duty position levels acquired from said duty position and organization information storage circuit, and further, calculates a duty-position level variation, which is a variance value of said duty position levels;

a single document detection circuit that detects a document, for which said calculated duty-position level average is lower than a predetermined value and said calculated duty-position level variation is smaller than a predetermined value, as an illegitimate document for which there is a violation in said access authorization; and an organization information calculation circuit, wherein said at least one group includes a plurality of groups, and said duty position and organization information storage circuit further stores therein pieces of group hierarchy information representing dependency relations among said plurality of groups, a root group representing a group whose member number is larger than any other one of said plurality of groups each being authorized to access a corresponding one of said documents stored in said document storage circuit, and inter-organization distances representing distances between said route group and said respective plurality of groups, wherein, for each of documents acquired from said document storage circuit, said organization information calculation circuit calculates an inter-organization distance average, which is an average value of inter-organization distances of respective all of groups which are authorized to access said each document acquired from said document storage circuit, by using inter-organization distances acquired from said duty position and organization information storage circuit, and further, calculates an inter-organization distance variation, which is a variance value of said inter-organization distances, and wherein said single document detection circuit detects a document, for which said calculated inter-organization distance average is higher than a predetermined value and said calculated inter-organization distance variation is smaller than a predetermined value, as an illegitimate document for which there is a violation in said access authorization.

2. The document control apparatus according to claim 1, further comprising:

a calculation result storage circuit, and a plural documents detection circuit, wherein:

said document storage circuit further stores therein pieces of document hierarchy information representing dependency relations among said plurality of documents stored in said document storage circuit;

said calculation result storage circuit acquires said document hierarchy information, and, for each of documents acquired from said document storage circuit, stores therein said duty-position level average calculated by said duty position information calculation circuit or said inter-organization distance average calculated by said organization information calculation circuit, on the basis of said acquired document hierarchy information; and in the case where any two documents, which are located adjacent to each other in an up and down direction in said document hierarchy information, satisfies any one of two conditions, one being that a duty-position level average of a lower-side document is higher than that of an upper-side document, the other one being that an inter-organization distance average of a lower-side document is higher than that of an upper-side document, or in the case where any two documents, which are located adjacent to each other in a left and right direction in said document hierarchy information, satisfies any one of two conditions, one being that a difference between a duty-position level average of a left-side document and that of a right-side document is larger than a predetermined value, the other one being that a difference between an inter-organization distance average of a left-side document and that of a right-side document is larger than a predetermined value, said plural documents detection circuit detects a pair of said adjacent documents as illegitimate documents.

3. The document control apparatus according to claim 2, wherein said plural documents detection circuit detects a document, which belongs to both of said detected pair of adjacent documents in said up and down direction and said detected pair of adjacent documents in said left and right direction as an illegitimate document.

4. The document control apparatus according to claim 1, further comprising a calculation result storage circuit that, for each of documents acquired from said document storage circuit, stores therein said duty-position level average calculated by said position information calculation circuit or said inter-organization distance average calculated by said organization information calculation circuit, wherein, for each of documents acquired from said document storage circuit, said single document detection circuit calculates a duty-position level average difference between a previous duty-position level average, which was previously stored into said calculation result storage circuit, and a new duty-position level average which, after an elapse of a predetermined period of time, said duty-position information calculation circuit newly calculates, on the basis of information acquired from said duty-position and organization information storage circuit, or an inter-organization distance average difference between a previous inter-organization distance average, which was previously stored into said calculation result storage circuit, and a new inter-organization distance average which, after an elapse of a predetermined period of time, said organization information calculation circuit newly calculates, on the basis of information acquired from said duty-position and organization information storage circuit, and wherein said single document detection circuit detects a document, for which said duty-position level average difference is larger than a predetermined value or said inter-organization distance average difference is larger than a predetermined value, as an illegitimate document.

5. A method for detecting a violation in document access authorization, the method comprising:

storing a plurality of documents, for each of which access authorization is performed such that an access authority to access said each document is granted to a corresponding one of users of said each document or a corresponding one of at least one group said users belong to, into document storage circuit;

storing duty position levels, which represent height levels of respective official positions with respect to said users, into duty position and organization information storage circuit;

for each of documents acquired from said document storage circuit, calculating a duty-position level average, which is an average value of duty position levels of respective all of users who are authorized to access said each document acquired from said document storage circuit, by using duty position levels acquired from said duty position and organization information storage circuit, and further, calculating a duty-position level variation, which is a variance value of said duty position levels; and detecting a document, for which said calculated duty-position level average is lower than a predetermined value and said calculated duty-position level variation is smaller than a predetermined value, as an illegitimate document for which there is a violation in said access authorization;

wherein:

said at least one group includes a plurality of groups, and said duty position and organization information storage circuit further stores therein:

pieces of group hierarchy information representing dependency relations among said plurality of groups, a root group representing a group whose member number is larger than any other one of said plurality of groups each being authorized to access a corresponding one of said documents stored in said document storage circuit, and inter-organization distances representing distances between said route group and said respective plurality of groups, for each of documents acquired from said document storage circuit, said organization information calculation circuit calculates:

an inter-organization distance average, which is an average value of inter-organization distances of respective all of groups which are authorized to access said each document acquired from said document storage circuit, by using inter-organization distances acquired from said duty position and organization information storage circuit, and an inter-organization distance variation, which is a variance value of said inter-organization distances, and said single document detection circuit detects a document, for which said calculated inter-organization distance average is higher than a predetermined value and said calculated inter-organization distance variation is smaller than a predetermined value, as an illegitimate document for which there is a violation in said access authorization.

6. The method according to claim 5, further comprising:

storing pieces of group hierarchy information representing dependency relations among a plurality of said at least one groups, a root group representing a group whose member number is larger than any other one of said plurality of groups each being authorized to access a corresponding one of said documents stored in said document storage circuit, and inter-organization distances representing distances between said route group and said respective plurality of groups, into said duty-position and organization information storage circuit; and for each of documents acquired from said document storage circuit, calculating an inter-organization distance average, which is an average value of inter-organization distances of respective all of groups which are authorized to access said document, by using inter-organization distances acquired from said duty position and organization information storage circuit, and further, calculating an inter-organization distance variation, which is a variance value of said inter-organization distances, and detecting a document, for which said calculated inter-organization distance average is higher than a predetermined value and said calculated inter-organization distance variation is smaller than a predetermined value, as an illegitimate document for which there is a violation in said access authorization.

7. The method according to claim 6, further comprising:

storing pieces of document hierarchy information, representing dependency relations among said plurality of documents stored in said document storage means, into said document storage circuit; and acquiring said document hierarchy information, and, for each of documents acquired from said document storage circuit, storing said duty-position level average or said inter-organization distance average on the basis of said acquired document hierarchy information, and in the case where any two documents, which are located adjacent to each other in an up and down direction in said document hierarchy information, satisfies any one of two conditions, one being that a duty-position level average of a lower-side document is higher than that of an upper-side document, the other one being that an inter-organization distance average of a lower-side document is higher than that of an upper-side document, or in the case where any two documents, which are located adjacent to each other in a left and right direction in said document hierarchy information, satisfies any one of two conditions, one being that a difference between a duty-position level average of a left-side document and that of a right-side document is larger than a predetermined value, the other one being that a difference between an inter-organization distance average of a left-side document and that of a right-side document is larger than a predetermined value, detecting a pair of said adjacent documents as illegitimate documents.

8. The method according to claim 6, further comprising:

for each of documents acquired from said document storage circuit, storing said duty-position level average or said inter-organization distance average into calculation result storage circuit; and for each of documents acquired from said document storage circuit, calculating a duty-position level average difference between a previous duty-position level average, which was previously stored into said calculation result storage circuit, and a new duty-position level average which, after an elapse of a predetermined period of time, is newly calculated on the basis of information acquired from said duty-position and organization information storage circuit, or an inter-organization distance average difference between a previous inter-organization distance average, which was previously stored into said calculation result storage circuit, and a new inter-organization distance average which, after an elapse of a predetermined period of time, is newly calculated on the basis of information acquired from said duty-position and organization information storage circuit; and detecting a document, for which said duty-position level average difference is larger than a predetermined value or said inter-organization distance average difference is larger than a predetermined value, as an illegitimate document.

9. A non-transitory recording medium that records therein a program causing a computer to carry out a processing method, the method comprising:

storing a plurality of documents, for each of which access authorization is performed such that an access authority to access said each document is granted to a corresponding one of users of said each document or a corresponding one of at least one group said users belong to, into document storage circuit;

storing duty position levels, which represent height levels of respective official positions with respect to said users, into duty position and organization information storage circuit;

for each of documents acquired from said document storage circuit, calculating a duty-position level average, which is an average value of duty position levels of respective all of users who are authorized to access said each document acquired from said document storage circuit, by using duty position levels acquired from said duty position and organization information storage circuit, and further, calculating a duty-position level variation, which is a variance value of said duty position levels; and detecting a document, for which said calculated duty-position level average is lower than a predetermined value and said calculated duty-position level variation is smaller than a predetermined value, as an illegitimate document for which there is a violation in said access authorization;

wherein:

said at least one group includes a plurality of groups, and said duty position and organization information storage circuit further stores therein:

pieces of group hierarchy information representing dependency relations among said plurality of groups, a root group representing a group whose member number is larger than any other one of said plurality of groups each being authorized to access a corresponding one of said documents stored in said document storage circuit, and inter-organization distances representing distances between said route group and said respective plurality of groups, for each of documents acquired from said document storage circuit, said organization information calculation circuit calculates:

an inter-organization distance average, which is an average value of inter-organization distances of respective all of groups which are authorized to access said each document acquired from said document storage circuit, by using inter-organization distances acquired from said duty position and organization information storage circuit, and an inter-organization distance variation, which is a variance value of said inter-organization distances, and said single document detection circuit detects a document, for which said calculated inter-organization distance average is higher than a predetermined value and said calculated inter-organization distance variation is smaller than a predetermined value, as an illegitimate document for which there is a violation in said access authorization.

\* \* \* \* \*